(12) United States Patent
Weiss et al.

(10) Patent No.: US 8,255,083 B2
(45) Date of Patent: Aug. 28, 2012

(54) INDUSTRIAL ROBOT AND METHOD FOR CONTROLLING THE MOVEMENT OF AN INDUSTRIAL ROBOT

(75) Inventors: Martin Weiss, Margertshausen (DE); Manfred Hüttenhofer, Meitingen (DE); Andreas Hagenauer, Friedberg (DE); Günther Wiedemann, Gersthofen (DE)

(73) Assignee: KUKA Laboratories GmbH, Augsburg (DE)

( * ) Notice: Subject to any disclaimer, the term of this patent is extended or adjusted under 35 U.S.C. 154(b) by 308 days.

(21) Appl. No.: 12/739,552

(22) PCT Filed: Oct. 22, 2008

(86) PCT No.: PCT/EP2008/064294
§ 371 (c)(1),
(2), (4) Date: Apr. 23, 2010

(87) PCT Pub. No.: WO2009/062826
PCT Pub. Date: May 22, 2009

(65) Prior Publication Data
US 2010/0312389 A1    Dec. 9, 2010

(30) Foreign Application Priority Data
Nov. 15, 2007  (DE) .......................... 10 2007 056 117

(51) Int. Cl.
*B25J 9/00*        (2006.01)
(52) U.S. Cl. ....................................... 700/252; 700/245
(58) Field of Classification Search .................. 700/245, 700/250–253, 246, 257
See application file for complete search history.

(56) References Cited

U.S. PATENT DOCUMENTS

| | | | |
|---|---|---|---|
| 6,853,878 B2 * | 2/2005 | Hirayama et al. | 700/245 |
| 7,130,718 B2 * | 10/2006 | Gunnarsson et al. | 700/254 |
| 7,136,723 B2 * | 11/2006 | Hirayama et al. | 700/245 |
| 7,742,838 B2 * | 6/2010 | Weib | 700/248 |

(Continued)

FOREIGN PATENT DOCUMENTS

EP    1 724 676 A1    11/2006

(Continued)

OTHER PUBLICATIONS

European Patent Office; International Search Report in International Patent Application No. PCT/EP2008/064294 dated Apr. 14, 2009; 6 pages.

(Continued)

*Primary Examiner* — Drew Brown
(74) *Attorney, Agent, or Firm* — Wood, Herron & Evans, LLP

(57) ABSTRACT

The invention relates to an industrial robot (1) having a control apparatus (8), and to a method for controlling the movement of the industrial robot (1). For the purposes of the method, an instruction which is intended for controlling the industrial robot (1) is checked, an interpreted instruction is produced by interpretation of the checked instruction by means of an interpreter (13), and the interpreted instruction is stored in a temporary store (10). This process is repeated until a first keyword is detected. A data record (15) is then produced from the interpreted instructions stored in the temporary store (10), wherein the data record (15) has information relating to at least one path element of a path on which the industrial robot (1) is intended to be moved. The data record (15) is loaded into a buffer store (11), is checked by the buffer store (11) and is interpolated by means of an interpolator (14), in order to move the industrial robot (1) on the path element.

27 Claims, 6 Drawing Sheets

Start of program execution
—Ipr

Repeat

- Get next command
- Interpret command
- If movement or technology command, then write planning result to the pre-run buffer until program end is reached

V

Repeat endlessly

- Wait until pre-run buffer is not empty
- Get individual data record from the pre-run buffer
- Execute individual data record in a real manner Ipo|

U.S. PATENT DOCUMENTS

2005/0107915 A1* 5/2005 Reyier et al. .................. 700/245
2006/0004479 A1 1/2006 Oyama et al.
2009/0076653 A1* 3/2009 Hietmann et al. ............ 700/252

FOREIGN PATENT DOCUMENTS

WO 03/057428 A1 7/2003
WO 2006/056349 A1 6/2006

OTHER PUBLICATIONS

Dooley, G.; Forth for Robot Control; Robotics Age USA, vol. 7, No. 9 dated Sep. 1985; pp. 7-8.
Mccurdy, C.; Forth Programming Language for Control Systems: Potential Advantages; Measurement and Control, vol. 20, No. 5. dated May 1987; pp. 45-48.

* cited by examiner

INDUSTRIAL ROBOT AND METHOD FOR CONTROLLING THE MOVEMENT OF AN INDUSTRIAL ROBOT

The invention relates to an industrial robot and a method for controlling the movement of an industrial robot.

Industrial robots in general are manipulating machines, which are equipped with useful tools for automatic handling of objects, and are programmable in a plurality of motion axes, in particular with regard to orientation, position and process sequence. In general, industrial robots comprise a robot arm, a control apparatus, and possibly an effector, which may be designed for example as a gripper for gripping a tool and is attached to the robot arm or can be attached thereto. The robot arm represents in essence the movable part of the industrial robot, and has a plurality of axes, which are selected by the control apparatus for the movement of the industrial robot, using for example electric drives, so that the effector for example is moved on a predetermined path.

Figure 1:
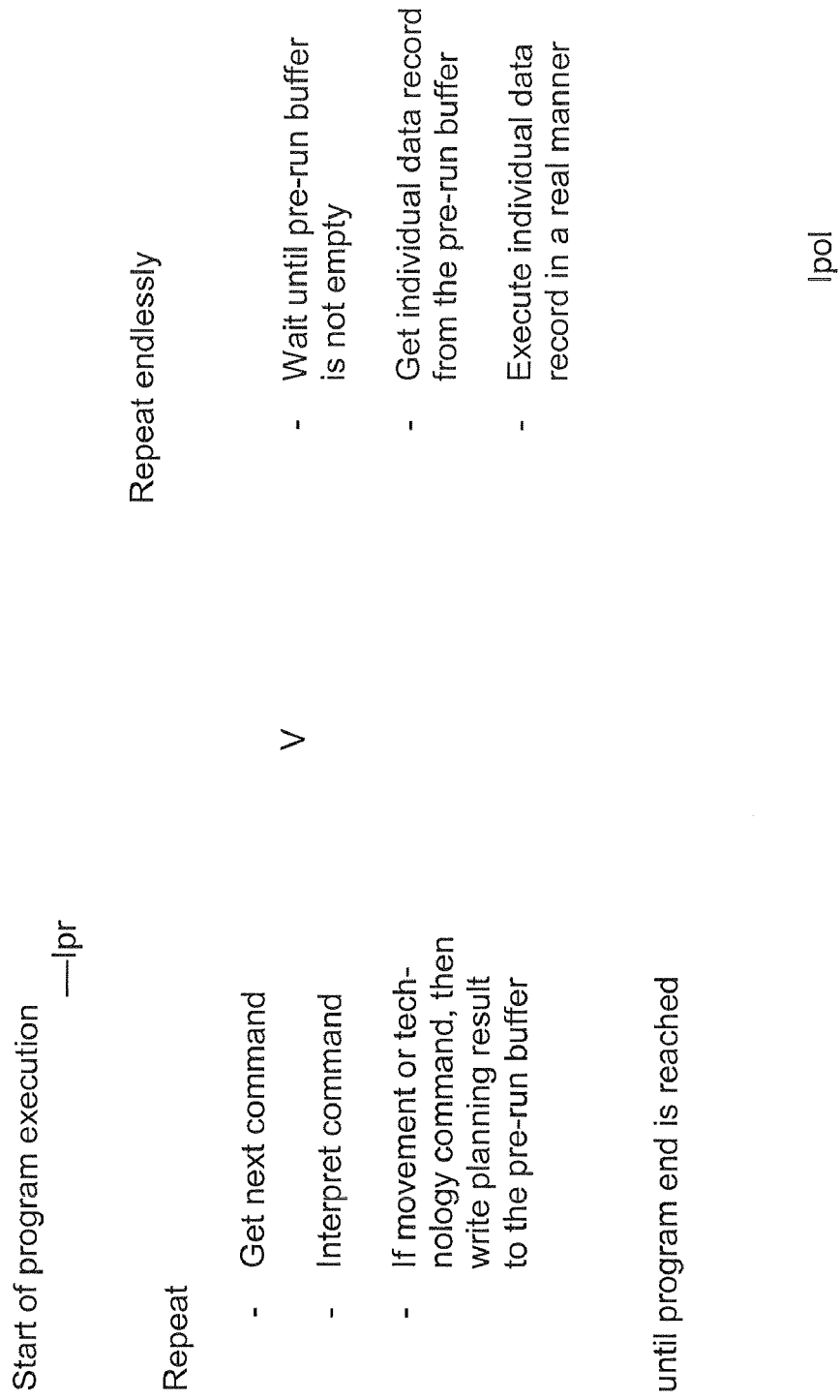

Conventional methods for controlling the movement of the industrial robot are based on the control apparatus of the industrial robot planning the path which the latter is to travel, for example by means of the flow chart depicted in FIG. 1.

For the planning, an interpreter Ipr of the control apparatus or of a computer program running on the latter creates individual data records comprising geometry and velocity profiles, for example from programmed points stored in a memory of the control apparatus and assigned to the path, in particular while the industrial robot is moving. Assigned to each of the individual data records is a single movement instruction for the industrial robot; in their totality they determine the movement of the industrial robot as it traverses the path. The individual data records planned by the interpreter Ipr are then written to a buffer of limited length ("pre-run buffer" V) of the control apparatus ("pre-run"). Individual technology commands, which are also known as technological instructions or technology instructions, are also written to the pre-run buffer along with their temporal and/or geometric references to the path. Technological instructions mean for example setting or deleting, possibly in reference to the path, of analog or digital outputs of the industrial robot, analog output in proportion to velocity, geometric or thermal oscillation, etc. The individual programmed points were determined ahead of time, for example by means of direct or indirect programming procedures.

The planned individual data records are run through from the pre-run buffer V by a so-called interpolator Ipol of the control apparatus while the industrial robot is in motion, in order to obtain in particular desired position values for the movement of the industrial robot ("main run"). The calculation of the desired position values from the individual data records is performed according to fixed calculating rules, and is called "interpolation." The interpolation and the planning of the individual data records represent different tasks. Multitasking of the control apparatus ensures that additional individual data records can be planned in conjunction with the "pre-run," quasi-parallel to the interpolation.

Planning of the movement in the "pre-run" is necessary in part in order to perform a smoothing of the movement or a calculation of a spline contour from the individual data records (movement instructions). In order to be able to calculate a partial movement subsequent to the movement of the industrial robot currently being executed, one needs, along with the individual data record (movement instruction) assigned to the current partial movement of the industrial robot, at least one planned individual data record subsequent to the current individual data record, including the smoothing connection to the individual data record currently being executed by the industrial robot. Smoothing is realized by planning a plurality of individual data records (movement instructions) in advance.

As a rule, a relatively short time is needed for planning an individual data record—on the order of under 30 ms when using present-day control apparatuses. The actual execution time of the partial movement assigned to the individual data record on the industrial robot, on the other hand, is normally significantly longer, for example ranging from several hundreds of ms up to several seconds.

The calculation or planning of the movement of an industrial robot not shown in greater detail, based on a conventional method, can be illustrated as follows:

$$\vdots$$
$$LIN\ P1\ C\_DIS$$
$$(HL)\ ñ\quad LIN\ P2\ C\_DIS$$
$$LIN\ P3\ C\_DIS$$
$$LIN\ P4\ C\_DIS$$
$$(VL)\ ñ\quad LIN\ P5\ C\_DIS$$
$$LIN\ P6\ C\_DIS$$
$$LIN\ P7\ C\_DIS$$
$$\vdots$$

where movements are identified with a label "C_DIS" for "smoothing."

Currently for the example of a conventional controller, an industrial robot executes, during its main run/interpolation (abbreviation: HL) a partial movement of its total movement, which is assigned to an individual data record (movement instruction) LIN P2 C_DIS. In order to actually implement drives for example of the industrial robot for the movement instruction assigned to the individual data record LIN P2 D_DIS, the interpolator Ipol creates the appropriate commands for the drives from this individual data record.

The industrial robot has already ended the partial movement that preceded the current partial movement, which is assigned to the individual data record LIN P1 C_DIS.

If the industrial robot begins its movement at the partial movement assigned to the individual data record LIN P3 C_DIS, then the pre-run takes from the preliminary run buffer V the individual data record LIN P3 C_DIS planned in the course of the pre-run (abbreviation: VL), and the planning can insert the newly planned individual data record LIN P6 C_DIS at the position in the pre-run buffer which is now free.

An advantage of the conventional planning is that the interpolator Ipol can begin already relatively early with the actual execution for example of a smoothed contour, even if the path on which the industrial robot is being moved is not yet completely known as such.

The computing power of the control apparatus can also be used for other tasks, however, so that the load on the control apparatus is not deterministic. This is especially the case if the control apparatus performs additional operations, in particular potentially computer-intensive ones, between the movement instructions. This can be illustrated for example as follows:

```
    ⋮
LIN P1 C_DIS
(HL) ñ LIN P2 C_DIS
LIN P3 C_DIS
LIN P4 C_DIS
(VL) ñ FOR I=1 TO N DO CALL Subroutine ENDFOR
LIN P5 C_DIS
LIN P6 C_DIS
LIN P7 C_DIS
    ⋮
```

In this case, the control apparatus executes a task that is assigned to the command "FOR I=1 TO N DO CALL Subroutine ENDFOR". In such a case, it is possible that the pre-run may not receive the next movement command (programmed point) for a relatively long time. As a result, it is not deterministic how many individual data records the pre-run may run ahead. This can vary from one execution cycle of the process to the next.

Figure 2:
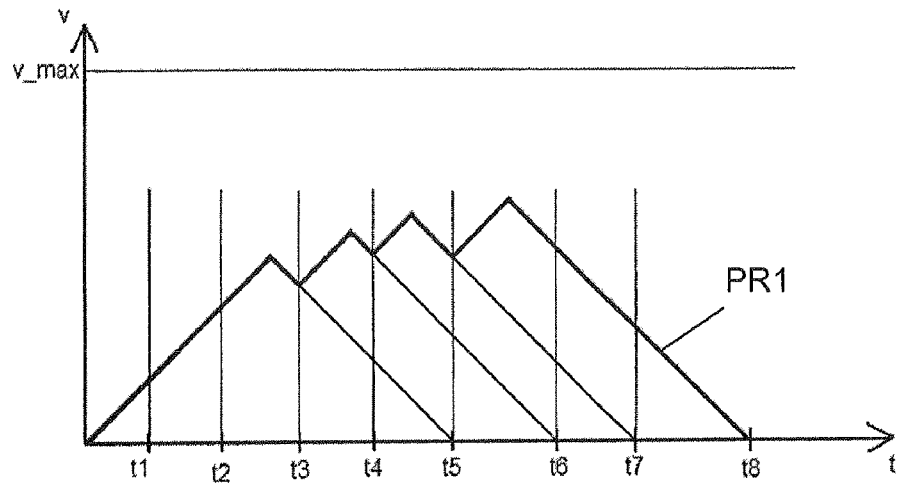
Figure 3:
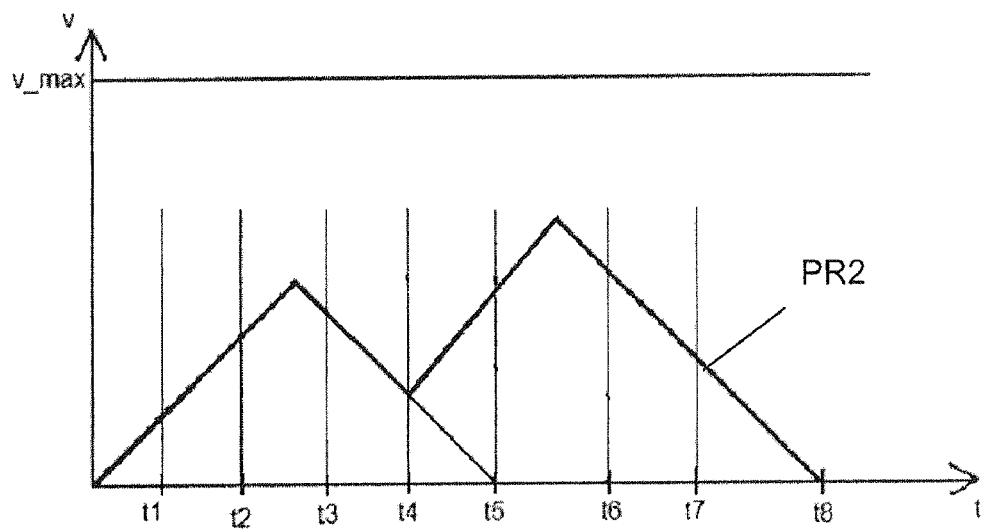

That can result in the following disadvantages:

1. The speed profile is dependent on the processor loading, i.e., the load on the control apparatus. But the industrial robot must always be able to stop on the remainder of the path visible in the pre-run, while staying on the path. The visible remaining path varies, depending on the computing time available for the planning. Speed contours PR1, PR2 for the same path contour, which are dependent on the load on the control apparatus, are depicted in FIGS. 2 and 3. Speed profile PR1, shown in FIG. 2, is assigned to a relatively light load, and speed profile PR2, shown in FIG. 3, to a relatively heavy load on the control apparatus.

2. The industrial robot does not necessarily move at the time-optimal speed: If the entire contour from exact stop to exact stop were known, the industrial robot would be able to move at a higher speed, including the elastic time stopping option, than with the preview limited by the length of the pre-run buffer.

3. The geometric path on which the industrial robot moves depends on the processor loading, i.e., the load on the control apparatus. Exact stop is or is not run, depending on whether or not smoothing is possible. The control system first calculates the exact stop path, on which an emergency off may possibly be executed.

4. In certain operating modes, such as "single step processing" or "reverse travel," or by record selection, the unit travels to the programmed individual points of the path, since for reasons of simple implementation the compiler/interpreter of the control apparatus executes only one movement instruction, but does not analyze any surroundings around this possibly smoothed movement data record.

5. Under "emergency off" the industrial robot may possibly move on a different path than in undisturbed program operation (potentially "stop on path" to the exact stop point).

Because of disadvantages 1, 3 the process geometry and process speed are not deterministic.

Because of disadvantages 3, 4, 5 a safety interval must be maintained around the path and programmed points, since both the exact stop path and the smoothed path must be traversable without collision.

The object of the invention is therefore to specify a method for controlling the movement of an industrial robot, which enables a prerequisite for a potentially higher speed of movement of the industrial robot.

The problem of the invention is solved by a method for controlling the movement of an industrial robot, having the following procedural steps:

a) Retrieving an instruction provided for controlling an industrial robot, b Producing an interpreted instruction by interpreting the retrieved instruction by means of an interpreter, c) Storing the interpreted instruction in a temporary memory, d) Repeating steps a) through c) until a first keyword is detected, e) Producing a data record from the interpreted instructions stored in the temporary memory, the data record having information about at least one path element of a path on which the industrial robot is intended to move, f) Loading the data record into a buffer memory, and g) Recalling the data record stored in the buffer memory and interpolating the data record recalled from the buffer memory by means of an interpolator, in order to move the industrial robot on the path element.

The invention also provides an industrial robot having a control apparatus that carries out the method according to the invention.

In another aspect of the invention, a computer program is provided that is directly loadable into a memory of a control apparatus of an industrial robot, and that has a software code with which the method according to the invention is carried out when the computer program product is running on the control apparatus of the industrial robot.

In contrast to conventional planning methods such as the planning method described in the introduction, according to the method according to the invention a plurality of instructions are assembled into a segment which is stored in the temporary memory as a data record. The temporary memory is for example part of the control apparatus of the industrial robot, and the segment is identified for example by parentheses with keywords.

To control the movement of the industrial robot, according to the invention the individual instructions, in particular individual movement and technology instructions, are recalled from a memory of the control apparatus and interpreted by means of the interpreter. All of the subsequent instructions are interpreted by the interpreter of the robot programming language in use, until the first keyword is reached. The beginning of interpretation of the first instruction, or the start of storing the interpreted instructions, can begin for example when the interpreter detects a second keyword.

The result of the interpretation of the individual instructions is not written immediately to a buffer memory (pre-run buffer) of the control apparatus, however, but to the temporary memory. Thus the temporary memory is used to collect the interpreted instructions, but it can have in particular the same data format as geometry, speed and technology records in the memory buffer. In contrast to otherwise normal speed profiles, the temporary memory may also have regions with a speed of "0", for example because of wait instructions. The buffer memory may have in particular a predetermined length.

As soon as the first keyword is reached, the content of the temporary memory is transferred to the buffer memory as the data record.

According to one embodiment of the method according to the invention, only instructions with a reduced instruction set are used for the data record.

According to another embodiment of the method according to the invention, no control structures or control instructions are used for the data record, in particular no control structures that could generate endless loops (for example, no recursive function calls, only so-called "FOR" loops with a fixed end, no "while/repeat" loops). That prevents the calculation of the data record from taking an infinite length of time.

It is also possible not to allow any sensor-guided instructions for the data record, nor any instructions having a temporally indeterminate duration, such as wait instructions for example, which will cause the interpreter to wait until a corresponding signal is set.

According to another embodiment of the method according to the invention, the data record has at least movement instructions, technology instructions, and time-specified wait instructions. Examples of movement instructions are point-to-point (PTP) movements, linear (LIN) movement instructions, circular arc (CIRC) movement instructions and SPLINE instructions.

Technology instructions are understood as the possibly path-related setting and/or deleting of analog and digital outputs, speed-proportional analog output, geometric or thermal oscillation.

According to another embodiment of the method according to the invention, the data record is free of nesting of segments.

Thus the interpreter according to the method according to the invention plans the path element by means of the segment assigned to the data record, as an elementary instruction, equivalent to a single, already known movement or technology instruction. In the conventional pre-run concept, the segment corresponds exactly to a single movement or technology instruction.

It is true that the planning time increases because of the method according to the invention, since the interpolator starts later; but on the other hand the outcome is deterministic, making potentially higher movement speeds of the industrial robot possible.

In the conventional planning method, only one of a single movement or technology instruction is regarded as an element (individual data record). In a pre-run of only a single individual data record, the complete segment according to the method according to the invention corresponds to only one entry in the buffer memory (pre-run buffer), although it was built up internally out of a plurality of commands. In this way, a greater preview of the real path can be realized while the buffer memory (pre-run buffer) remains the same length. The time response within this segment is deterministic, because the planned movement, comprising a plurality of partial movements (path elements), is first completely planned and then is turned over to the main run (interpolator).

According to one embodiment of the method according to the invention, the data record includes information about the entire path or has this additional repetition of steps a) through g), in order to produce an additional data record that includes information about an additional path element of the path, where the additional path element follows the path element.

The segment (data record) may for example contain a plurality of smoothed or non-smoothed movements, or else spline movements.

The realization, i.e., the programming of the data record (segment) goes beyond the known blocks as logical grouping in higher programming languages such as C, C++ "{ ... }" or Pascal (BEGIN ... END), or even subroutine calls, even if the concept according to the invention is syntactically similar to these and the segment is defined for example by keywords such as "BEGIN" "END". This is because a block in the programming language "C" only notifies a compiler that a sequence of a plurality of statements is to be regarded for example as one statement in the flow of control. Nothing is said about the time response. In contrast, the method according to the invention specifies a deterministic main run behavior (interpolation).

The method according to the invention corresponds more to a task lock in a multitasking system. In a multitasking environment, a calculation for example is not interruptible by an interrupt instruction (at least from the perspective of the interpolator).

Accordingly, the method according to the invention creates a prerequisite for a higher (deterministic) path speed of the industrial robot. For reasons of safety, it is normally necessary that a movement plan be the basis for generating only movements that are able to come to a stop in the planned remaining travel, i.e., on the part of the path on which the industrial robot is still supposed to move to the next exact stop, since for example and emergency off reaction could be necessary, or no additional movements could follow. The maximum speed of movement of the industrial robot is thus limited by the foreseeable remaining travel available in the pre-run.

FIG. 2 shows this behavior for the conventional method already described in the introduction, on the basis of speed profile PR1: Whenever the pre-run has planned an additional individual data record and has thereby extended the visible remaining travel, the speed in the planning can be increased. However, this higher speed is dependent on the processor loading in the control apparatus.

By means of the method according to the invention, a longer process path is reported to the planning of the movement in a simple manner as a unit, so that the maximum permissible speed on this entire path can be planned.

One embodiment of the method according to the invention therefore contains the provision that the data record, because of the interpreted instructions stored in the temporary memory, includes information about a location-dependent speed at which the industrial robot is to move on the path element assigned to the data record. Alternately or in addition, it can also be provided that the data record, because of the interpreted instructions stored in the temporary memory, includes information about a time-based movement with which the industrial robot is to move on the path element assigned to the data record.

The method according to the invention also allows planning or movement of the same contour in all operating modes. With conventional controllers having a pre-run/main-run concept, the unit moves to the exact stop point for example to test a program, or when traveling backward, or when selecting a record, even for points that are smoothed in program operation. After all, it is difficult to determine the contour of the program operation, because of possible control structures, calculated points and the analysis of an environment that is necessary for smoothing. For example, the contour of a spline path around one point, depending on the order of the spline employed, is not known until a plurality of preceding and following points are known. This is difficult to realize with common compilers and interpreters, since a command environment of unknown size must be analyzed.

With the method according to the invention, the entire contour or a partial contour is interpreted as one data record and is available as a whole. That makes it relatively simple to travel the program contour, even with the functions "single step," "program operation," "backward travel," "record selection." Thus it is possible that the programmed points on a smoothed or spline path are always traversed.

That makes it possible to save smaller safety intervals around the programmed or programmed [sic! -Transl.] points.

In the case of smoothed contours, it is generally not known how far and how long this contour takes from exact stop to exact stop, since it is made up piece-by-piece. There are applications, however, in which the process must last a certain time. Examples of such processes are:

1. In applications such as foam-filling, a form along a contour must be filled with a prescribed quantity of foam. The dosage of foam is normally not controllable, but rather the rate R=quantity of foam per unit of time is constant. So in order to apply a desired quantity M, the contour must be traversed in the time T=M/R. If the processing time cannot be predetermined, the processing time for the contour must first be ascertained in a learning run, and the speed then adjusted accordingly.

If the contour is known on the basis of the method according to the invention, the control apparatus of the industrial robot can first plan the contour with the specification "time-optimized," and the resulting time $T_{opt}$ can then be used in order to extend the speed profile to the desired time T, for example by time scaling (as long as $T_{opt}$<T; otherwise the problem is unsolvable). That means that the time-optimized plan delivers a path description as the function $f_{opt}: [0, T_{opt}] \rightarrow R^n$; actually, however, a function $f: [0, T] \rightarrow R^n$ is interpreted, where $f_{opt}(t) = f(t*T_{opt}/T)$. The time specification may also only refer to partial segments or intermediate points.

2. Specification of the heat input along the contour similar to foam input. The specification of the time that an entertainment robot needs in order to move synchronously with video or audio signals.

It is also possible to interpret individual segments as one movement data record, in order to smooth them over in turn.

A data record (segment) can also be interpreted as a process contour.

A record selection may apply not only to one record, but to the process contour, by traveling the shortest way to the contour of the segment.

Limited range of commands within the segment: Control structures such as IF THEN ELSE, WHILE, REPEAT, and calculation of points for movement commands, are not permitted within the segment, in order to guarantee deterministic planning of the segment. In particular, the number of partial movements in the segment is fixed.

Figure 4:
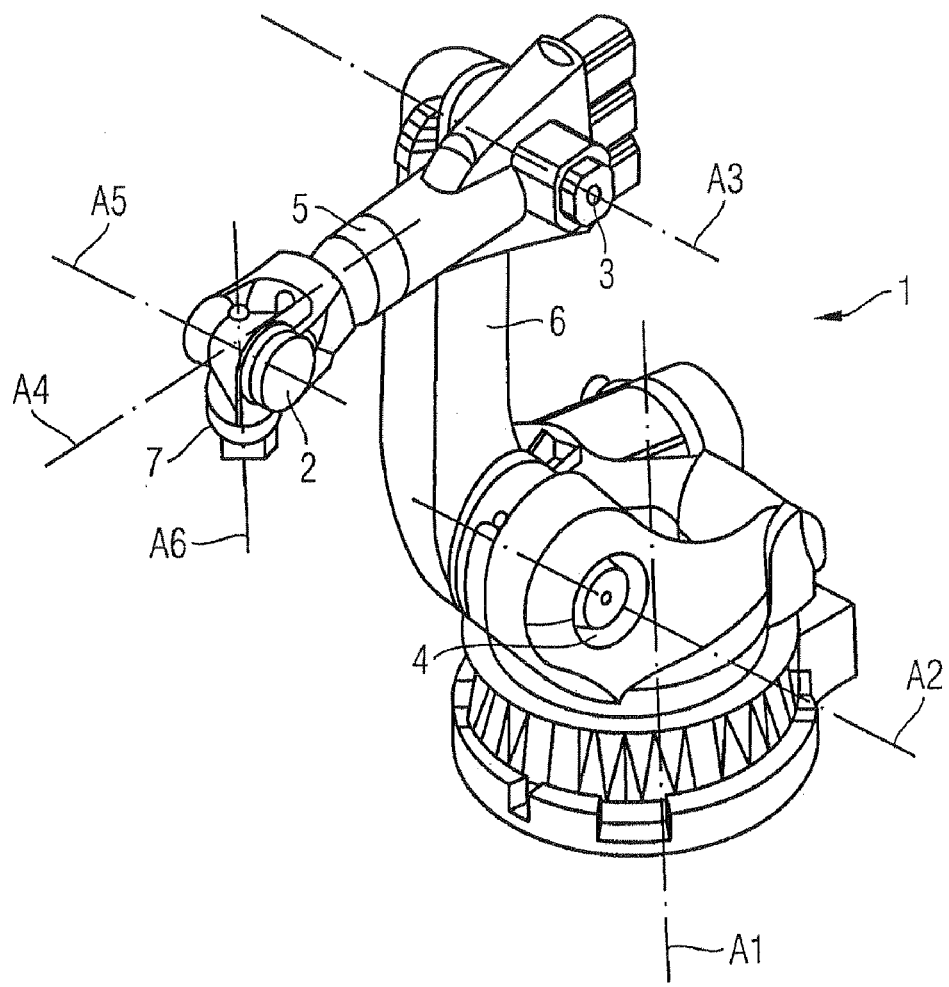
Figure 4:
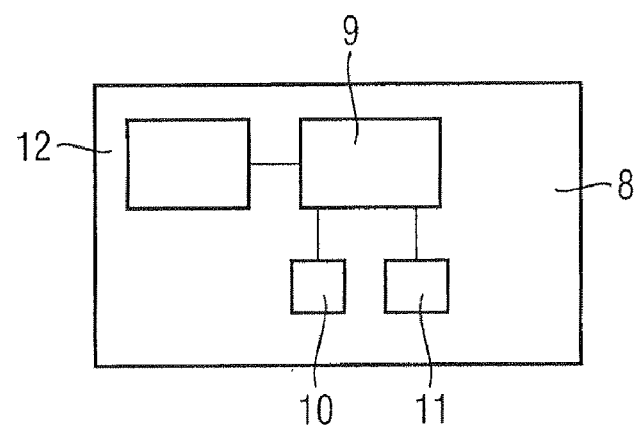
Figure 5:
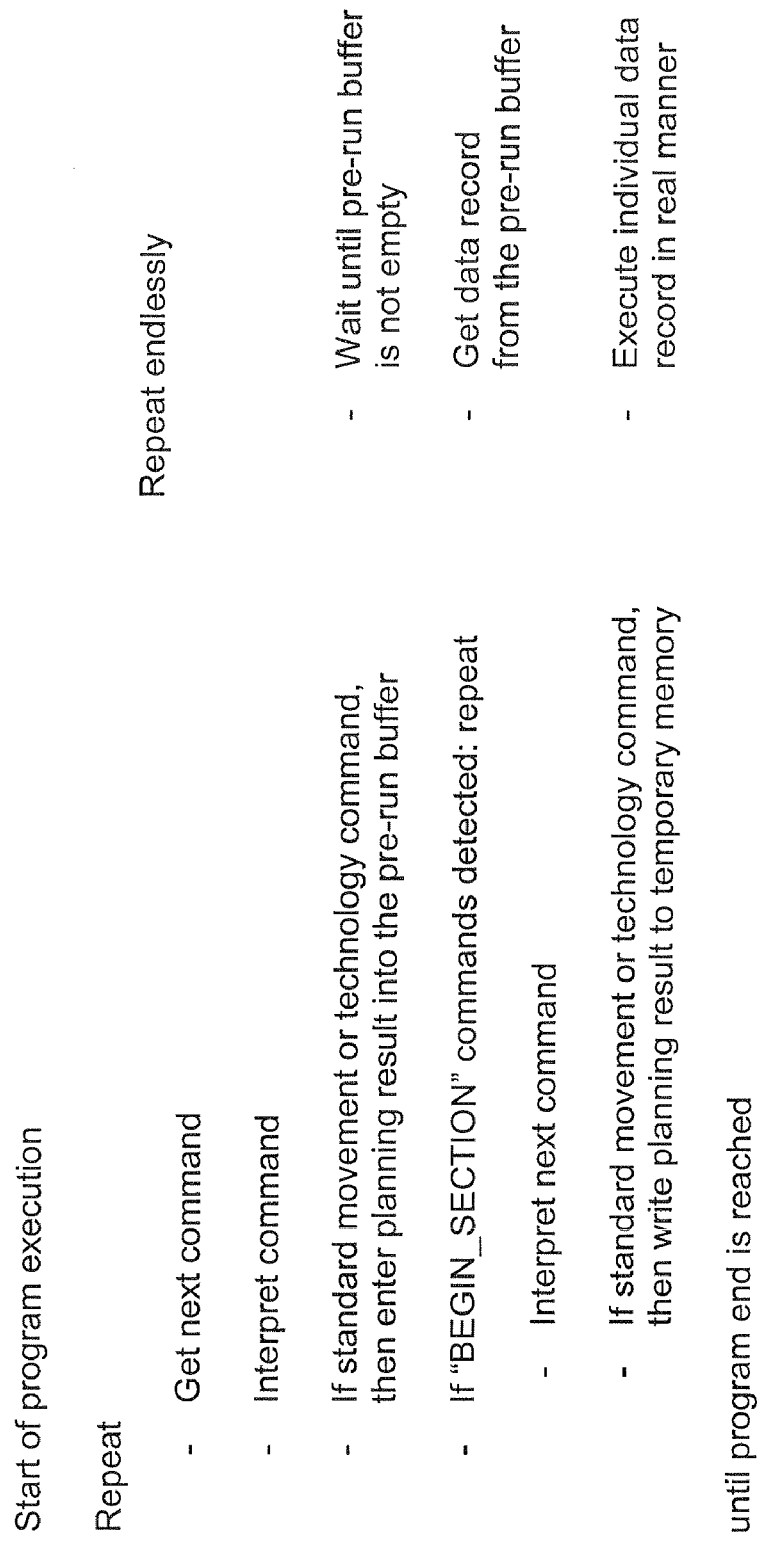
Figure 6:
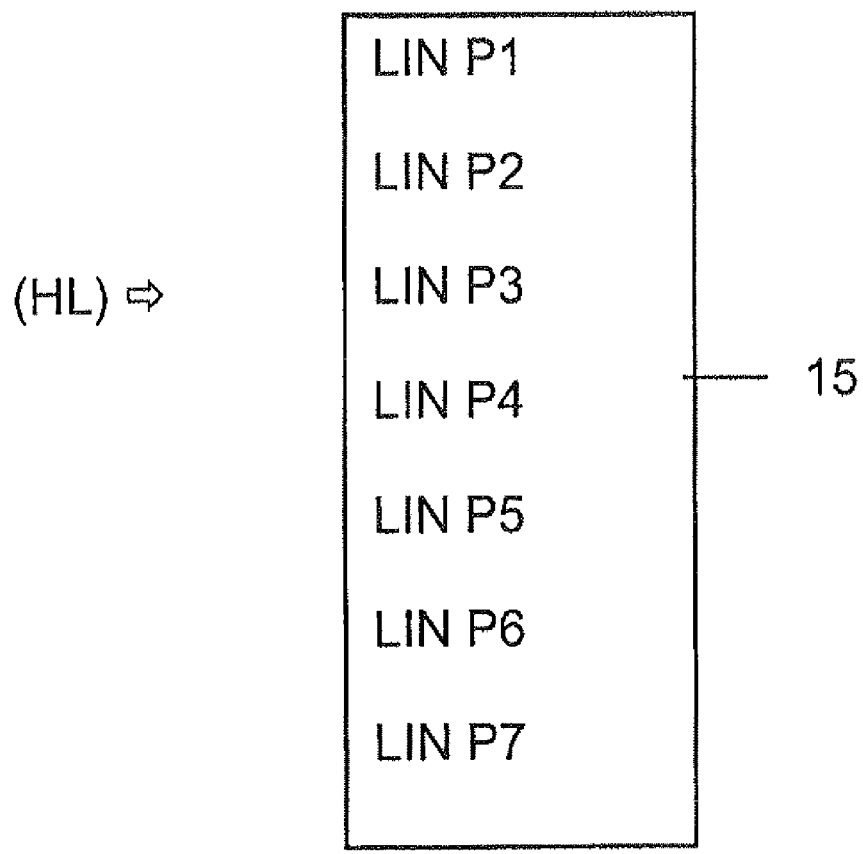
Figure 7:
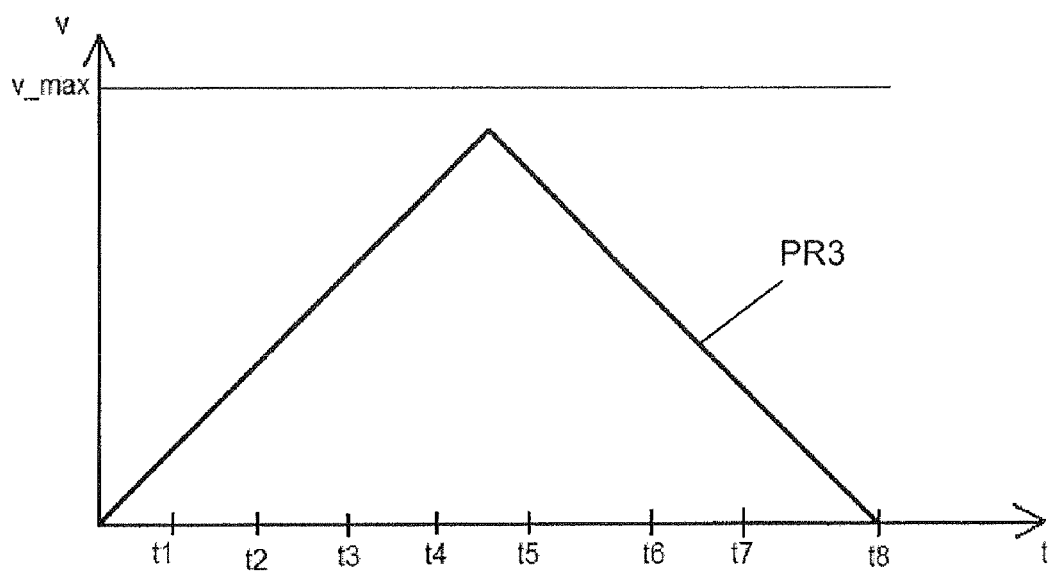

An example of an exemplary embodiment of the invention is depicted in the attached schematic drawings. The figures show the following:

FIG. 1 a flow chart for a conventional planning method,

FIGS. 2 and 3 speed profiles of the movement of a conventional industrial robot having a conventional control apparatus, FIG. 4 an industrial robot having a control apparatus, FIG. 5 a flow chart to illustrate the planning process running on the control apparatus of the industrial robot of FIG. 4, FIG. 6 illustrates the behavior of the control apparatus of the industrial robot of FIG. 4, and FIG. 7 a speed profile of the movement of the industrial robot of FIG. 4.

FIGS. 1 through 3 were already described in the introduction.

FIG. 4 shows an industrial robot 1 with kinematics for movements in for example six degrees of freedom. Industrial robot 1 has, in a generally known way, joints 2 through 4, levers 5, 6, six motion axes A1 through A6, and a flange 7 to which an effector (not shown in greater detail, for example a tool) may be attached.

Each of the motion axes A1 through A6 is moved by a drive, not shown in greater detail. Each of the drives includes for example an electric motor and a gearbox, as generally known to the person skilled in the art.

Industrial robot 1 also has a control apparatus, in the case of the present exemplary embodiment a control computer 8, which is connected with the drives of industrial robot 1 in a non-depicted manner and controls them by means of a computer program running on control computer 8, so that flange 7 of industrial robot 1 executes a prescribed movement.

Control computer 8 has a memory 12, a processor 9 connected to the memory, a temporary memory 10 connected to processor 9, and a pre-run buffer 11 connected to the processor and which in the case of the present exemplary embodiment has a fixed length. In memory 12 there are programmed points for a path on which industrial robot 1 is intended to move its flange 7 or an effector attached to flange 7.

The individual programmed points of the path were ascertained in advance in a generally known manner, for example by means of direct or indirect programming procedures.

In addition, running on control computer 8 is a computer program which plans a movement of industrial robot 1 based on the programmed points, and which controls the electric drives on the basis of the planning in such a way that flange 7 or the effector moves on the desired path.

The programmed planning method in the case of the present exemplary embodiment is illustrated with a flow chart depicted in FIG. 5, and FIG. 6 illustrates the behavior of control computer 8 of industrial robot 1.

In contrast to conventional planning methods, such as the planning method described in the introduction, the computer program running on control computer 8 or its interpreter 13 is set up so that the interpreter assembles a plurality of instructions, in the case of the example shown in FIG. 6 linear movement instructions "LIN P1," "LIN P2," "LIN P3," "LIN P4," "LIN P5," "LIN P6" and "LIN P7," into one segment 15. This segment 15 is identified in the case of the present exemplary embodiment by parentheses with the keywords "BEGIN SECTION" and "END SECTION."

In the case of the present exemplary embodiment, after the planning of the path is started, individual movement and technology instructions are recalled from memory 12 and interpreted using interpreter 13. As soon as the interpreter 13 of the robot programming language in use reaches a keyword, "BEGIN SECTION" in the case of the present exemplary embodiment, all subsequent instructions are interpreted until the next keyword, "END_SECTION" in the case of the present exemplary embodiment.

The result of the interpretation of the individual movement and technology instructions is not written immediately to the pre-run buffer 11 of control computer 8, however, but to the internal temporary memory 10 of control computer 8. The temporary memory 10 is used to collect the movement instructions, technology instructions and wait instructions, but it has the same data format as geometry, speed and technology records in the pre-run buffer 11. In contrast to otherwise normal speed profiles, the temporary memory 10 may also have regions with a speed of "0", for example because of wait instructions.

As soon as the keyword "END SECTION" is reached, the content of the temporary memory 10 is transferred to the pre-run buffer 11 as a data record.

In the case of the present exemplary embodiment, only a reduced range of instructions are allowed within segment 15.

In particular, in the case of the present exemplary embodiment no control structures or control instructions are allowed that could generate endless loops (for example, no recursive function calls, only so-called "FOR" loops with a fixed end, no "while/repeat" loops), or no control structures or control instructions at all. That prevents the calculation of the data record assigned to segment 15 from taking an infinite length of time.

Furthermore, in the case of the present exemplary embodiment no sensor-guided movements are allowed, nor any instructions having a temporally indeterminate duration, such as wait instructions for example, which will cause the interpreter 13 to/wait until a corresponding signal is set.

In the case of the present exemplary embodiment, the interpretation of at least the following instructions within segment 15 is possible, however:

1, movement instructions such as point-to-point (PTP) movements, linear (LIN) movement instructions, circular arc (CIRC) movement instructions or SPLINE instructions, 2. technology instructions, i.e., the possibly path-related setting and/or deleting of analog and digital outputs, speed-proportional analog output, geometric or thermal oscillation, and 3. time-specified wait instructions.

Furthermore, no nesting of segments is allowed within segment 15.

In the case of the present exemplary embodiment, the instructions summarized in segment 15 yield the entire contour along which industrial robot 1 is to move, or at least a partial section of the entire contour.

For reasons of safety, it is normally necessary that a movement plan be the basis for generating only movements that are able to come to a stop in the planned remaining travel, i.e., on the part of the path on which the industrial robot 1 is still intended to move to the next exact stop, since for example an emergency off reaction could be necessary, or no additional movements could follow. The maximum speed of movement of industrial robot 1 is thus limited by the foreseeable remaining travel available in the pre-run.

FIG. 2 shows this behavior for the conventional method already described in the introduction, on the basis of speed profile PR1: Whenever the pre-run has planned an additional individual data record and has thereby extended the visible remaining travel, the speed in the planning can be increased. However, this higher speed is dependent on the processor loading in the control apparatus.

By means of the planning on the control computer 8 of industrial robot 1, a longer process path is reported to the planning of the movement in a simple manner as a unit, so that the maximum permissible speed on this entire path can be planned. This is illustrated with a speed profile PR 3 depicted in FIG. 7.

The invention claimed is:

1. A method for controlling the movement of an industrial robot, comprising:
  a) retrieving at least one instruction for controlling at least a portion of an industrial robot;
  b) analyzing and interpreting the at least one retrieved instruction to produce at least one corresponding interpreted instruction;
  c) storing the at least one interpreted instruction in a temporary memory;
  d) in response to detecting a first keyword, producing a data record from the at least one interpreted instruction stored in the temporary memory, the data record including information about at least one path element of a path along which the portion of the industrial robot is to move;
  e) loading the data record into a buffer memory; and
  f) interpolating the data record to move the portion of the industrial robot along the path element.

2. The method of claim 1, wherein storing the at least one interpreted instruction is begun in response to detecting a second keyword.

3. The method of claim 1, wherein instructions with a reduced set of commands are included in the data record.

4. The method of claim 1, further comprising:
  retrieving at least one second instruction for controlling at least the portion of the industrial robot;
  analyzing the at least one second instruction; and
  in response to determining that the at least one second instruction is a control structure, disregarding the at least one second instruction.

5. The method of claim 4, wherein at least part of the control structure is selected from the group of control structures consisting of a control structure that produces an endless loop, an instruction having a temporally indefinite duration, and a sensor-guided instruction.

6. The method of claim 1, wherein the data record includes an instruction selected from the group of instructions consisting of a movement instruction, a technology instruction, and a time-specified wait instruction.

7. The method of claim 1, wherein the data record does not include nested segments.

8. The method of claim 1, wherein the data record includes information about the entire path.

9. The method of claim 1, further comprising:
  producing an additional data record that includes information about an additional path element of the path, wherein the additional path element is configured after the path element.

10. The method of claim 9, further comprising:
  smoothing the data record and the additional data record.

11. The method of claim 9, further comprising:
  smoothing the transition between the data record and the additional data record.

12. The method of claim 1, wherein the data record includes at least one smoothed interpreted instruction.

13. The method of claim 1, wherein the data record includes at least one spline instruction.

14. The method of claim 1, wherein the data record includes information about a location-dependant speed at which the portion of the industrial robot is to move along the path element.

15. The method of claim 1, wherein the data record includes information about a time-based movement with which the portion of the industrial robot is to move along the path element.

16. A computer program product that is loadable into a memory of a control apparatus of an industrial robot, comprising:
  software code that, when executed by the control apparatus of the industrial robot, performs the method of claim 1.

17. An industrial robot, comprising:
  a control apparatus that executes software code to perform the method of claim 1.

18. A method for controlling the movement of an industrial robot, comprising:
  analyzing a first instruction;
  in response to determining that at least a portion of the first instruction is associated with a first keyword, analyzing a second instruction;
  interpreting the second instruction to produce a corresponding interpreted instruction;
  storing the interpreted instruction in a temporary memory; and
  analyzing a third instruction;

in response to determining that at least a portion of the third instruction is associated with a second keyword, transferring the interpreted instruction as a first data record from the temporary memory to a buffer memory, the first data record including information about a first path element of a path along which a portion of the industrial robot is to move.

19. The method of claim 18, further comprising:
analyzing a fourth instruction; and
in response to determining that the fourth instruction is associated with one of a recursive function call, a control structure, or a temporally indeterminate duration, disregarding the fourth instruction.

20. The method of claim 18, wherein the second instruction is a movement instruction selected from the group of movement instructions consisting of a point-to-point movement instruction, a linear movement instruction, a circular arc movement instruction, a smoothed instruction, and a spline movement instruction.

21. The method of claim 18, wherein the second instruction is a technology instruction.

22. The method of claim 18, wherein the second instruction is a temporally-specified wait instruction.

23. The method of claim 18, further comprising:
producing a second data record that includes information about a second path element of the path, wherein the second path element is configured after the first path element.

24. The method of claim 23, further comprising:
smoothing the first data record and the second data record.

25. The method of claim 23, further comprising:
smoothing the transition between the first data record and the second data record.

26. The method of claim 18, wherein the first data record includes information about a location-dependant speed at which the portion of the industrial robot is to move along the first path element.

27. The method of claim 18, wherein the first data record includes information about a time-based movement with which the portion of the industrial robot is to move along the first path element.

* * * * *